July 7, 1970  E. W. ENGLE ET AL  3,519,309
ROTARY CONE BIT RETAINED BY CAPTIVE KEEPER RING
Filed Aug. 12, 1965  3 Sheets-Sheet 1

INVENTORS
EDGAR W. ENGLE
ROBERT D. GOODFELLOW, JR.
BY

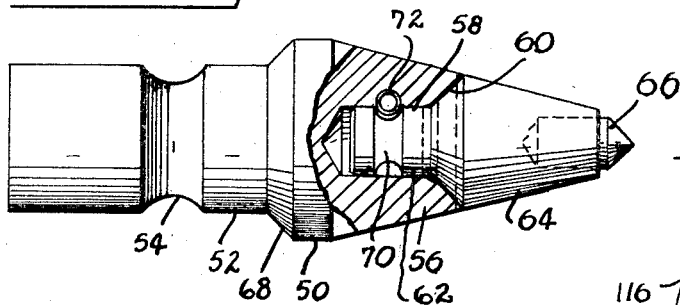
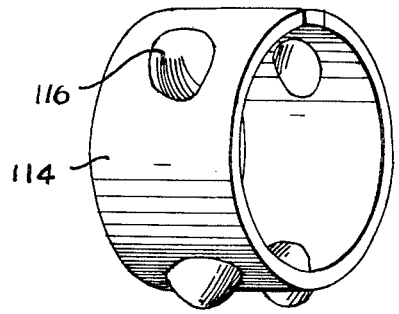
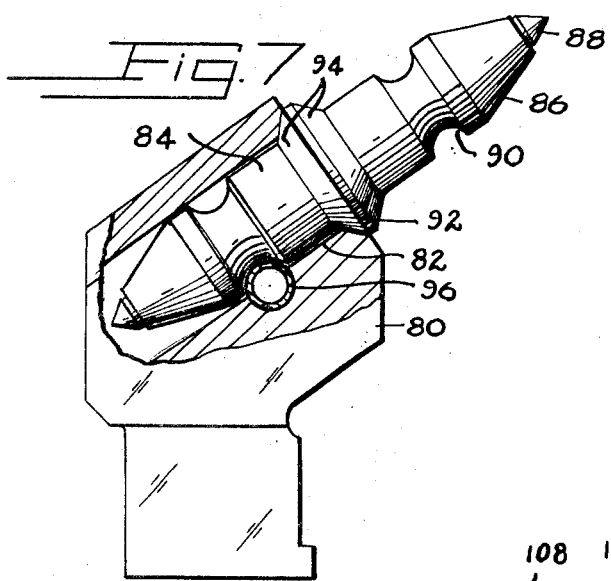
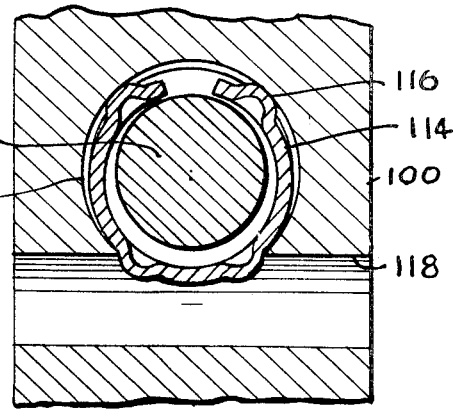
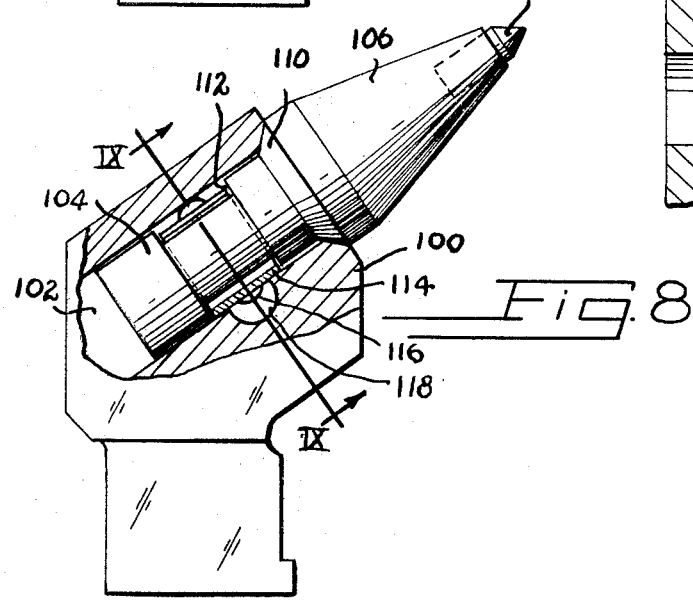
INVENTORS
EDGAR W. ENGLE
ROBERT D. GOODFELLOW, JR July 7, 1970  E. W. ENGLE ET AL  3,519,309

ROTARY CONE BIT RETAINED BY CAPTIVE KEEPER RING

Filed Aug. 12, 1965  3 Sheets-Sheet 3

INVENTORS
EDGAR W. ENGLE
ROBERT D. GOODFELLOW, JR.
BY
Melvin A. Crosby

United States Patent Office 3,519,309
Patented July 7, 1970

3,519,309
ROTARY CONE BIT RETAINED BY CAPTIVE KEEPER RING
Edgar W. Engle, Laughlintown, and Robert D. Goodfellow, Jr., Bedford, Pa., assignors to Kennametal, Inc., Latrobe, Pa., a corporation of Pennsylvania
Filed Aug. 12, 1965, Ser. No. 479,094
Int. Cl. E21b 9/10; E21c 25/46, 35/18
U.S. Cl. 299—86                                             6 Claims

ABSTRACT OF THE DISCLOSURE

This specification discloses a rotary cone bit of the pick type which is mounted for free rotation in a supporting body. The bit comprises an elongated body having a hard insert at one end and a cylindrical shank at the other end. The shank is received in a bore in the supporting body and cooperating elements of an abutment are formed on the bit and body to take axial loads created by use. The shank is formed with an annular groove in which is mounted a split keeper ring that is held captive on the shank. The keeper ring is formed with a projection which is received in a recess in the body which opens onto the bore to hold the bit in the supporting body.

---

This invention relates to cutter elements or bit members, or picks and is particularly concerned with a novel structure for such an element and to a novel method of supporting and operating the element.

A cutting element or pick or bit member according to the present invention is a member somewhat like the cutting bit in a machine tool and having a metal body with a hard region or a hard insert therein at the place where the bit member engages the work. Such bit members are well known in many industries, such as in the mining industry and usually comprise a steel body, such as forged steel, with a cemented tungsten carbide tip or insert secured thereto as by brazing. Most mining bits are of the cutting type and actually cut the material against which the bit is brought.

A somewhat more recent type of bit member utilized for mining purposes is in the form of a pick-like bit member in which the body of the bit member is symmetrical about a longitudinal axis and which body has a shank at one end for support of the body and tapered inwardly at the other end and in which end there is a hard region or a hard insert such as a cemented tungsten carbide insert.

Pick-like bit members of the nature referred to can, of course, cut because the hard point end of the bit member can be caused to penetrate hard formations such as coal and ore, or the like. However, the pick-like bit members are more often employed for carrying out what is more properly described as a "picking" action wherein the bit member penetrates the region being worked and causes a somewhat explosive breaking up thereof.

It has been found, as in connection with coal, for example, that the cutting or breaking up of a vein of coal in this manner leads to obtaining larger sizes of coal, which is desirable, and reduces the quantity of fines, and produces better sizes.

Other uses of the bit member according to the present invention suggest themselves, such as for the teeth of digging buckets, scarifiers, and ditchers and the like, wherein the teeth must be hard and be highly wear resistant and which must penetrate formations which are sometimes quite hard or which contain rocks or the like.

In connection with known pick-like bit elements of the nature referred to, it has been customary as has been disclosed in the U.S. Pats. 3,268,259 and 3,268,260 to support the bit members fixedly in a support block or support member of some nature. When bit members of the type with which the present invention is concerned are supported in this manner they will, of course, operate to carry out a picking action on the formation being treated and thereby yield the benefits that obtain from the use of such pick-like bit members. However, the bit members so supported wear rapidly on one side and must frequently be removed and reconditioned or replaced. This involves expensive down time of the machine using the bit member and greatly interferes with maintaining the proper rate of production.

Furthermore, when the bit members wear off on one side, the inserts thin out and more readily break.

With the foregoing in mind, it is a primary object of the present invention to provide an improved pick-like bit member of the nature referred to, and an improved manner of supporting the bit member while it is working.

Another object of the present invention is the provision of bit member of the nature referred to and a support therefor by means of which the bit member is maintained in sharp prime cutting condition for a longer period of time than has heretofore been possible.

A still further object of the present invention is the provision of a bit member of the nature referred to and a method of supporting the same in which the exchanging of the bit member when necessary is greatly facilitated.

A still further object is the provision of a bit member of the nature referred to which has wide applicability not only to mining tools but also to other earth working equipment and the like.

A still another particular object of the present invention is the provision of a method of operating a bit member of the nature referred to which greatly enhances the life and efficiency of the bit member.

The foregoing objects as well as still other objects and advantages of the present invention will become more apparent upon reference to the following specification taken in connection with the accompanying drawings, in which:

FIG. 6 is a view partly in section showing a modified construction of the bit member;

FIG. 7 is a view like FIG. 3 partly in section showing a still further modified construction of the bit member wherein the bit member is formed as a double ended element;

FIG. 8 is a view like FIG. 3 but shows, in particular, a novel type keeper for detachably holding the bit member in its support block;

FIG. 9 is a sectional view indicated by line IX—IX on FIG. 8 and drawn at somewhat enlarged scale showing more in detail the nature of the keeper of FIG. 8;

FIG. 10 is a perspective view of the keeper of FIGS. 8 and 9;

Figure 1:
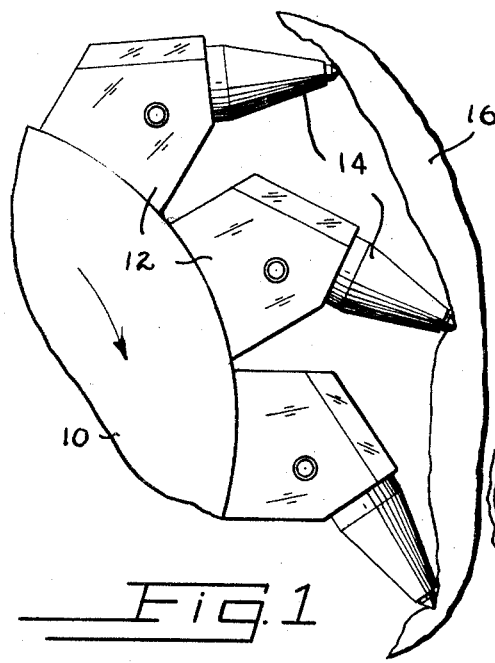
FIG. 1 is a more or less schematic showing of mining tool employing pick-like bit members according to the present invention and support blocks therefor also according to the present invention which blocks may be welded to a drum.

Referring to the drawing somewhat more in detail, in FIG. 1 a rotary member 10 has mounted on the periphery thereof a plurality of support blocks 12 and each support block carries a pick-like bit member 14 which is symmetrical about a predetermined axis, said axis extending at an angle to a radius of member 10. Blocks 12 can be distributed over the circumference and length of member 10 according to any desired or conventional pattern. Member 10 is driven by a suitable power means and is carried within the frame of, for example, a mining machine; and the mining machine is advanced in to a formation of ore or coal or the like which is indicated at 16.

The bit members engage the formation and causes the same to break up, whereupon, the broken up material is picked up on a conveyor and carried from the region of the mining machine. The operation of the mining machine is, of course, well known.

Figure 2:
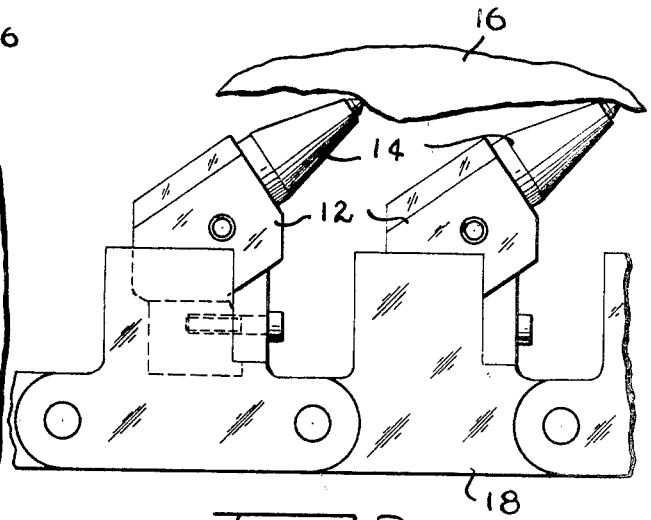
FIG. 2 is a somewhat schematic view similar to FIG. 1 showing bit members and support blocks therefor according to the present invention with the blocks bolted to a chain.

In FIG. 2 there is shown a chain 18 and on certain links thereof there are mounted the support blocks 12 and which support blocks carry bit members 14. Bit members 14 also engage a formation 16 so as to break up the material of the formation.

Figure 3:
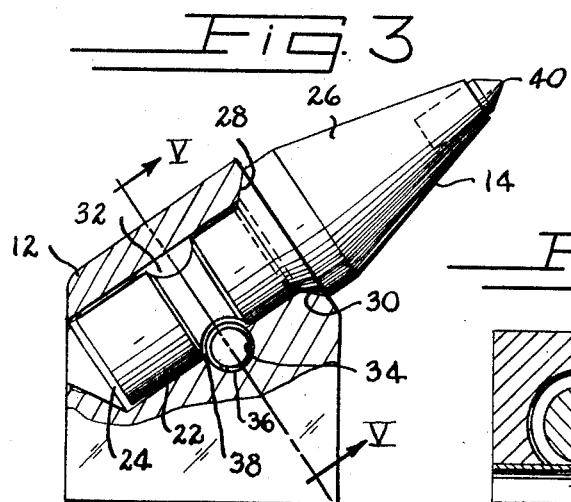
FIG. 3 is a view of the bit member and a support block therefor drawn at somewhat enlarged scale and partly in section.
Figure 5:
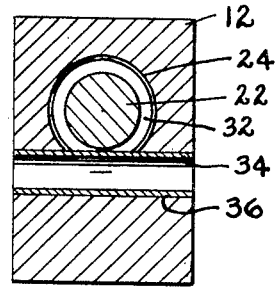
FIG. 5 is a sectional view indicated by V—V on FIG. 3 showing one manner of retaining the bit member and the support block therefor in assembled relation.
Figure 4:
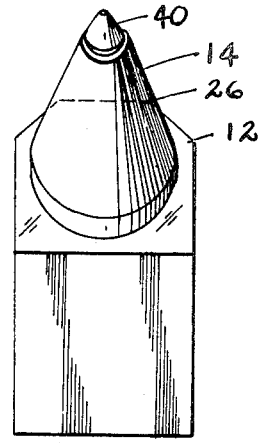
FIG. 4 is a view of the bit member and support looking in from the right side of FIG. 3.

FIGS. 3, 4 and 5 show typical bit members and support blocks therefor. In these figures it will be seen that bit member 14 comprises a cylindrical shank portion 22 extending into a bore 24 in the pertaining support block 12.

The shank portion 22 of the body of the bit member joins with the conical outer region 26 of the bit member by way of tapered shoulder or region 28. Tapered shoulder or region 28 of the bit member is adapted for bearing on a correspondingly tapered seat 30 at the mouth of bore 24 of support block 12. Intermediate the ends of shank portion 22 there is formed therein an annular recess or groove 32. This recess is for the purpose of receiving a keeper for retaining the bit member in assembled relation with the support block and, to this end, a keeper member 34 is provided in the support block and extending into recess 32.

In FIG. 3, the keeper member is in the form of a roll pin and it passes through a bore 36 provided therefor in support block 12 as will be seen in FIG. 5. An important advance according to the present invention resides in the dimensioning of groove 32 and roll pin 34 so that there is clearance between the roll pin and the wall of the groove or recess 32. This clearance is designated by reference numeral 38 in FIG. 3. The provision of this clearance permits the bit member to rotate in the support block during working and in this manner the wear is distributed completely about the periphery of the bit member and the point of the bit member will stay sharp and symmetrical about the longitudinal axis of the bit member for a long period of time.

It will be noted that the shank 22 of the bit member is loosely received in bore 24 of the support block so that the bit member is free to rotate therein while the tapered shoulder 28 and tapered seat 30 provide adequate support for the bit member against the impacts to which it is subjected and, likewise, provide a smooth region on which the bit member can turn while being worked. It will be evident that, as long as the impact force on the bit member falls within the confines of the tapered seat and shoulder referred to, the seat and shoulder will tend to center shank 22 in bore 24 and thus provide the optimum conditions for the bit member to rotate on its seat. By supporting the bit member so that it approaches the formation being worked at the proper angle, it is insured that the direction of impact force on the bit member is substantially in the direction referred to, and the bit member will rotate during working and thereby, as mentioned, distribute the wear thereabout and remain symmetrical and sharp for a long period of time.

In the outer end of the bit member there is installed a pointed insert 40 which may advantageously be formed of cemented tungsten carbide. This element is extremely hard and will, thus, withstand the wear imposed on the bit member by the formation being cut. It will also be appreciated, at this time, that unilateral wearing of the bit member would tend to thin out the inserted element 40 so that it would fracture relatively readily.

However, by the practice of the present invention, the bit member is permitted to rotate and the wear is distributed about the periphery of the bit member and the hard insert 40 so that the hard insert 40 does not tend to wear down to a thin section and easily fracture.

Thus, in adidtion to maintaining the bit member sharp and in service for a long period of time by permitting the member to rotate, the life of the bit member is greatly extended by the above mentioned preservation of the hard insert 40 through prevention of the same from wearing down to a thin easily fractured section.

In FIG. 6 there is shown a bit member of the nature referred to having a first body portion 50 with a shank 52 having a recess annular groove 54 therein corresponding to annular recess or groove 32 of FIG. 3. The body of the bit member comprises a conical outer portion 56 but in the arrangement of FIG. 6 the outer portion 56 of the body of the bit member comprises a bore 58 having a conical mouth region or seat 60.

Bore 58 is adapted for receiving the shank 62 of a second conical body member 64 which, at its outer end carries the hard insert 66 which may, as before, be made of cemented tungsten carbide. The second body member 64 has a tapered region to engage the tapered seat 60 similarly as the tapered region 68 of the first body member engages a correspondingly tapered seat in the support block therefor. The second body member 64 may have its shank grooved as at 70 for receiving a pin 72 in the first body member so that the second body member 64 may be rotatable in the first body member if so desired.

Thus, in the arrangement of FIG. 6, either one or the other, or both, of the body members can be supported so as to be free to rotate and thereby maintain the cutting insert of the bit sharp and symmetrical about the central axis of the bit at all times. Because the body member 64 is small, the cost of replacing bits is reduced.

Another advantageous modification is shown in FIG. 7. In FIG. 7 a support block 80 has a bore 82 therein adapted for receiving the shank region 84 of a bit member which is formed as a double ended bit. Both ends of the bit member are in the form of cylindrical shanks having pointed tip regions 86 with hard inserts 88 and with annular recess or groove means 90 being provided in each of the said shanks. Intermediate the shank portions and in about the middle of the length of the body is an outwardly extending region 92 forming tapered shoulders 94 on the opposite sides thereof adapted for engagement with a correspondingly tapered seat region at the mouth of bore 82. The roll pin 96 in the support block 80 loosely engages the groove in the shank that is disposed in bore 82. In this manner the bit is rotatably supported in the support block.

It will be evident that the bit of FIG. 7 can readily be reversed when one end becomes worn and a new tip presented to the work. This arrangement substantially reduces the number of bits required to maintain a machine in operation and likewise reduces the down time when it becomes necessary to restore the tools to efficient work- FIGS. 8 through 11 show a particularly important variation of the present invention, wherein a support block 100 is provided having a bore 102 therein for receiving the cylindrical shank 104 of a bit member having the outer portion thereof conically shaped as at 106 and with a hard wear resistant insert, such as cemented tungsten carbide, 108 mounted in the outer end. As before, the body of the bit member has a tapered shoulder at region 110 that engages a correspondingly shaped tapered seat at the mouth of bore 102 so that the bit member is rotatably supported by support block 100.

In the modification of FIGS. 8 through 10, however, instead of a recess or groove which is arcuate in cross section being formed in shank 104, the said shank has a substantially rectangular groove or recess 112 formed therein. This form of groove can be made somewhat more shallow than the arcuate groove of the previous modifications and thus detracts less from the strength of the shank. Nevertheless, sufficient length of the shank remains on both sides of groove 112 to give the shank good bearing in support block 100.

The groove 102 is adapted for receiving a resilient keeper member 114 which is shown somewhat more in detail in FIGS. 9 and 10. Keeper member 114 is a split ring of, for example, spring steel and it has a plurality of arcuate dimple-like projects 116 distributed thereabout. The keeper member 114 can be slipped over the larger outer end of shank portion 104 and will snap into groove 112 and is, thus, retained on the shank. The keeper member, however, can be compressed upon pushing the shank into bore 102 so that the shank will fit within the confines of the groove. When the bit member is completely inserted into the base the projections 116 of the keeper member will register with the transverse bore 118 provided in the support block for the aforementioned retainer pin so the keeper member can expand and in this manner the bit member will be retained in bore 102 of the support block.

The keeper member, however, is loosely disposed in groove 112 and thus does not in any way prevent the bit member from rotating in the bore of the support block. The bit member can readily be removed by pulling it outwardly from the bore, or by driving the bit member out from the back end of the support block.

The provision of the captive keeper member according to the modifications of FIGS. 8 through 10 is important because no tools are required to remove the bit member other than possibly, a punch and hammer or a pry bar, and, also, each bit member placed into the support block will have a new keeper thereon. The keeper members are thus not used long enough to deteriorate to the point that they will not hold the bit members in place.

This last mentioned feature is of importance because in former constructions where the keeper member was retained in the support block, the keepers, in the form of pins or resilient rubber-like pins with metal guards thereon, would tend to deteriorate and the supporting of a bit member in the support block became defective.

Mining machines, in particular, sometimes operate at high speeds and with keeper arrangements according to the prior art it became possible for the bit members to fly out of the machine, particularly when the member carrying the support block would vibrate under impact with the region being worked. According to the present invention, with a fresh keeper member on each bit member, this problem is completely solved and the bit members are securely retained in their respective support blocks throughout the life of the pertaining bit member.

At the same time, of course, the improved keeper arrangement permits free rotation of the bit members on the support block.

Figure 11:
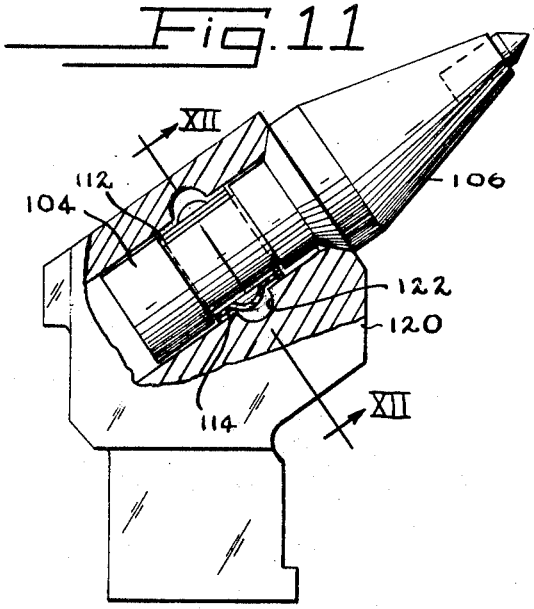
FIG. 11 is a view like FIG. 8 but shows the bit member and keeper of FIG. 8 with a somewhat differently constructed support block.

The arrangements of FIGS. 8 and 9 show a support block having the transverse bore for receiving a roll pin or the like according to conventional practices. In FIG. 11 the same bit members and keeper of FIG. 8 is illustrated and the same reference numerals are employed. However, in FIG. 11 the support block 120 is provided with an annular groove 122 therein for receiving the projections 116 of the keeper 114. This arrangement has the advantage of retaining the bore in which the bit shank extends more free of foreign matter than the arrangements of FIGS. 8 and 9 wherein the bore 118 extends completely through the block. All the advantages of the captive keeper that were referred to in respect to FIGS. 8 and 9 are present in the FIG. 11 construction.

Figure 12:
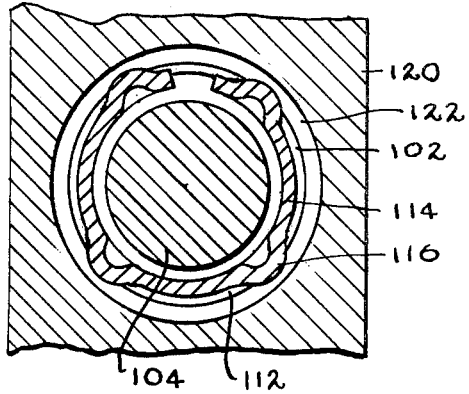
FIG. 12 is a sectional view indicated line XII—XII on FIG. 11 and drawn at somewhat enlarged scale and illustrating the modified construction the support block.

FIG. 12 shows the manner in which the projections 116 of the keeper 114 project into the relatively shallow annular groove 122 and thereby retain the shank of the bit member in the support block 120.

Figure 13:
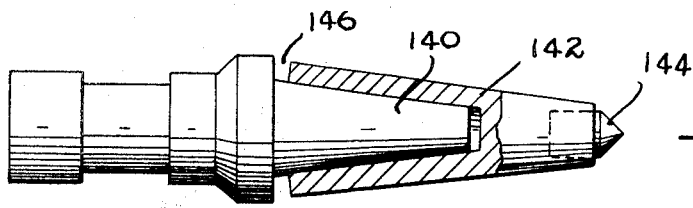
FIGS. 13, 14 and 15 are side views, partly in section, showing modified forms which the bit member according to the preesnt invention can take.
Figure 14:
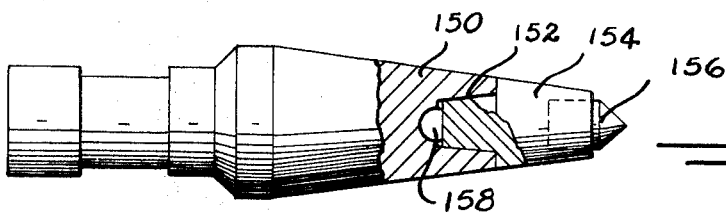
Figure 15:
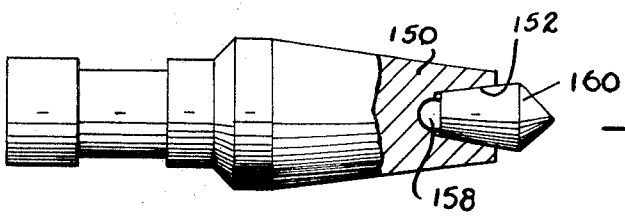

FIGS. 13 through 15 show modifications of the bit member in which the shank construction is the same as that shown in FIGS. 8 and 11. However, the outer end of the bit member in FIG. 13 is formed to a sticking taper configuration 140 and is adapted for receiving the tapered secondary body member 142 having a hard insert 144 at the tip. The bit of FIG. 13 can readily be restored to operating efficiency by knocking off the secondary body member 142 and placing another thereon. Because of the sticking taper configuration where the main and secondary body members meet there is no chance of the secondary body member becoming dislodged during use. The seconary body member can easily be removed by inserting a pry bar or like tool into the space 146 at the base of the secondary body member.

In FIG. 14 an inversion of the FIG. 13 construction is illustrated. In FIG. 14 the body member 150 of the main tool is formed with a recess 152 at the angle of a sticking taper and inserted therein is the tapered back end of the secondary body member 154 which carries the hard insert 156 at the tip.

In this arrangement it is advantageous to provide a bore 158 in the main body member 150 into which a drift pin or the like can be inserted for knocking out the secondary body member 154 when it is to be replaced.

In FIG. 15 an arrangement is shown wherein the main body member is the same body member 150 as is shown in FIG. 14. The replaceable element in FIG. 15 however is a complete body 160 of cemented tungsten carbide formed so as to stick in the tapered bore 152 formed in the outer end of main body member 150. With the arrangement of FIG. 15 the only thing that needs to be replaced is the carbide insert 160 itself which can easily be knocked out of tapered bore 152 by a drift pin inserted in hole 158.

All of the modifications described above are characterized in that the bit member is permitted to rotate on its axis with the advantages obtaining that have been referred to above.

The bit member has been described as being particularly useful in connection with mining tools and, in fact, this is the largest field of use for the tools. However, the teeth of digging buckets and the like could be provided with bit members according to the present invention and the teeth would remain sharp for a long period of time and efficiency of the digging buckets would be increased.

Furthermore, such tools as ditchers, scarifiers and the like could advantageously employ the disclosed bit members by providing support blocks therefor and mounting the bit members therein in such a manner that they rotated during use. This would maintain the members sharp and in good working condition for a long period of time.

It will be understood that this invention is susceptible to modification in order to adapt it to different usages and conditions; and accordingly, it is desire to comprehend such modifications within this invention as may fall within the scope of the appended claims.

What is claimed is:

1. A bit member comprising; a body symmetrical about an axis and having a tapered shoulder portion in about the middle of the length thereof, the body on one side of said shoulder portion being smaller in diameter than said shoulder portion and including a cylindrical region so as to serve as a supporting shank for the bit member, the body on the other side of said shoulder portion terminating in a point, an element harder than said body mounted in said body at said point, a support block having a bore therein loosely receiving said support shank, said block having a tapered seat region at the mouth end to engage the shoulder portion on the body, an annular groove in said shank portion, resilient keeper means freely rotatably mounted in said groove and compressible therein to a diameter as small as that of said bore to permit the said shank to be inserted into the bore, groove means in the bore in the plane of said keeper means when the shank is inserted into the bore, and narrower in the axial direction of the bore than said keeper means, and protuberance means on said keeper means adapted to engage said groove means so as to hold said shank in said bore against axial movement therein while permitting free rotation of the shank in the bore.

2. In combination in a pick type bit; a pick-like bit member symmetrical about a central axis and having a cylindrical shank at one end and a hard point at the other end, said shank being adapted for insertion into a bore in a support member to support said bit member rotatably on said support member, and keeper means captive on said shank but freely rotatable thereon and operable for detachably holding said shank in the bore in said support member and preventing axial movement of the shank in the bore while permitting free rotation of the shank within the bore, said shank being smaller in diameter than the body adjacent said shank, a tapered shoulder formed on said body at the shank end of said body, and a tapered mouth on said bore for engagement with said tapered shoulder.

3. A bit member comprising; a body symmetrical about an axis and having a tapered shoulder portion in about the middle of the length thereof, the body on one side of said shoulder portion being smaller in diameter than said shoulder portion and including a cylindrical region so as to serve as a supporting shank for the bit member, the body on the other side of said shoulder portion terminating in a point, an element harder than said body mounted in said body at said point, a support block having a bore therein loosely receiving said support shank, said block having a tapered seat region at the mouth end to engage the shoulder portion on the body, an annular groove in said shank portion, resilient keeper means comprising a resilient split ring slightly shorter in axial length than the axial length of said groove, said keeper means freely rotatably mounted in said groove and compressible therein to a diameter as small as that of said bore to permit the said shank to be inserted into the bore, and groove means in the bore in the plane of said keeper means when the shank is inserted into the bore, and narrower in the axial direction of the bore than said keeper means, and protuberance means comprising rounded dimples formed in said keeper means and projecting outwardly from on said keeper means and adapted to engage said groove means in the base so as to hold said shank in said bore against axial movement therein while permitting free rotation of the shank in the bore.

4. In the combination of a supporting body and a pick like bit member freely rotatable therein, said bit member comprising an elongate body having a hard inserted element at one end and a cylindrical shank at the other end, said shank being formed with an annular groove, said supporting body having a bore receiving said shank and formed with a reces opening into said bore, a split keeper ring assembled on said shank in said groove and normally captive thereon, said keeper ring having a portion projecting beyond the contour of said shank and received in said recess, and cooperating elements of an abutment on said body and bit member with the abutment limiting inward movement of the bit member relative to the supporting body, said keeper ring being compressible to accommodate insertion of the bit member into the body or removal of the bit member from the body.

5. The combination of claim 4 in which the groove in the shank is shallow and has side walls normal to the annular bottom thereof.

6. In a pick like bit intended for free rotation in a supporting body
  (a) an elongated body having a hard inserted element at one end and a cylindrical shank at the other end,
  (b) an annular groove in said shank,
  (c) a split keeper ring assembled on said shank in said groove and normally captive thereon,
  (d) a projection on said keeper ring extending beyond the contour of said shank; and
  (e) an element of an abutment on said body adapted to cooperate with a complemental abutment element on a supporting body in which the bit is inserted.

References Cited

UNITED STATES PATENTS

| | | | |
|---|---|---|---|
| 942,412 | 12/1909 | Rich | 172—713 X |
| 1,550,669 | 8/1925 | Bowman | 299—86 X |
| 2,121,202 | 6/1938 | Killgore | 175—374 |
| 2,610,049 | 9/1952 | Elles et al. | 299—91 |
| 3,027,953 | 4/1962 | Coski. | |
| 3,232,088 | 1/1966 | Newcomer et al. | 85—8.8 X |
| 3,268,260 | 8/1966 | Snipe | 299—91 |
| 3,331,637 | 7/1967 | Krekeler | 299—92 |
| 3,342,531 | 9/1967 | Krekeler | 299—92 |
| 3,342,532 | 9/1967 | Krekeler | 299—92 |

ERNEST R. PURSER, Primary Examiner

U.S. Cl. X.R.

85—8.8; 175—354; 299—91